United States Patent
Polti et al.

(10) Patent No.: US 9,839,336 B2
(45) Date of Patent: Dec. 12, 2017

(54) SEPARABLE HOSE SYSTEM FOR STEAM AND VACUUM CLEANING

(71) Applicant: POLTI SPA, Bulgarograsso (IT)

(72) Inventors: Francesca Polti, Bulgarograsso (IT); Stefano Cappi, Bulgarograsso (IT); Riccardo Turati, Bulgarograsso (IT)

(73) Assignee: POLTI SPA (IT)

( * ) Notice: Subject to any disclaimer, the term of this patent is extended or adjusted under 35 U.S.C. 154(b) by 19 days.

(21) Appl. No.: 14/910,889

(22) PCT Filed: May 23, 2014

(86) PCT No.: PCT/EP2014/060739
§ 371 (c)(1),
(2) Date: Feb. 8, 2016

(87) PCT Pub. No.: WO2015/018544
PCT Pub. Date: Feb. 12, 2015

(65) Prior Publication Data
US 2016/0183756 A1    Jun. 30, 2016

(30) Foreign Application Priority Data
Aug. 8, 2013 (IT) .............................. MI20130288 U

(51) Int. Cl.
A47L 11/34 (2006.01)
A47L 9/24 (2006.01)
A47L 11/40 (2006.01)

(52) U.S. Cl.
CPC .............. *A47L 11/34* (2013.01); *A47L 9/242* (2013.01); *A47L 9/248* (2013.01); *A47L 11/4088* (2013.01)

(58) Field of Classification Search
CPC .......... A47L 11/34; A47L 9/242; A47L 9/248; A47L 11/4088
See application file for complete search history.

(56) References Cited

U.S. PATENT DOCUMENTS

| 1,661,480 | A | * | 3/1928 | Keefer | A47L 11/30 15/103 |
| 3,909,197 | A | | 9/1975 | Cremers | |
| 5,542,147 | A | * | 8/1996 | Merten | A47L 11/34 15/321 |
| 5,555,597 | A | * | 9/1996 | Berfield | A47L 11/34 15/321 |

(Continued)

FOREIGN PATENT DOCUMENTS

| DE | 19538342 A1 | 4/1996 |
| GB | 2240468 A | 8/1991 |

OTHER PUBLICATIONS

Aug. 29, 2014—International Search Report for PCT/EP2014/060739.

*Primary Examiner* — Dung Van Nguyen
(74) *Attorney, Agent, or Firm* — Banner & Witcoff, Ltd.

(57) ABSTRACT

The present invention relates to vacuum cleaners with steam functionality (steam and vacuum cleaners), preferably to canister steam and vacuum cleaners, comprising a suction hose and a steam hose for respectively suctioning dirt and conveying steam, wherein the steam hose is external to the suction hose and comprises, at each end, a detachable connector, preferably a rapid-fitting detachable connector, for optionally detaching the steam hose when using only the vacuum cleaning functionality.

18 Claims, 8 Drawing Sheets

(56) References Cited

U.S. PATENT DOCUMENTS

| | | | | |
|---|---|---|---|---|
| 5,613,271 A | * | 3/1997 | Thomas | A47L 7/0009 |
| | | | | 15/321 |
| 5,891,198 A | * | 4/1999 | Pearlstein | A47L 11/34 |
| | | | | 15/322 |
| 2007/0107159 A1 | * | 5/2007 | Kawamoto | B08B 3/026 |
| | | | | 15/322 |
| 2007/0186370 A1 | * | 8/2007 | Oh | A47L 5/225 |
| | | | | 15/321 |

* cited by examiner

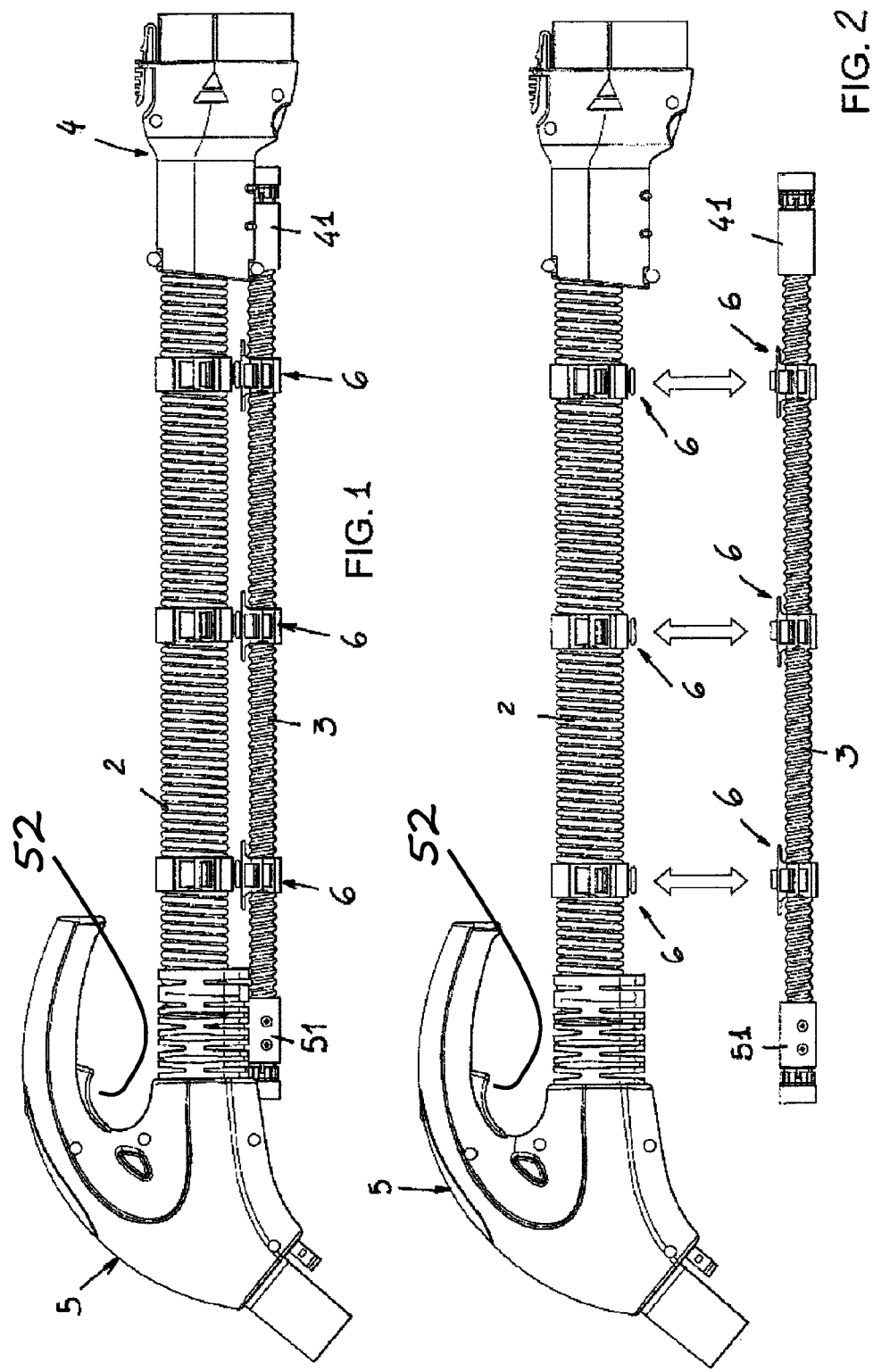

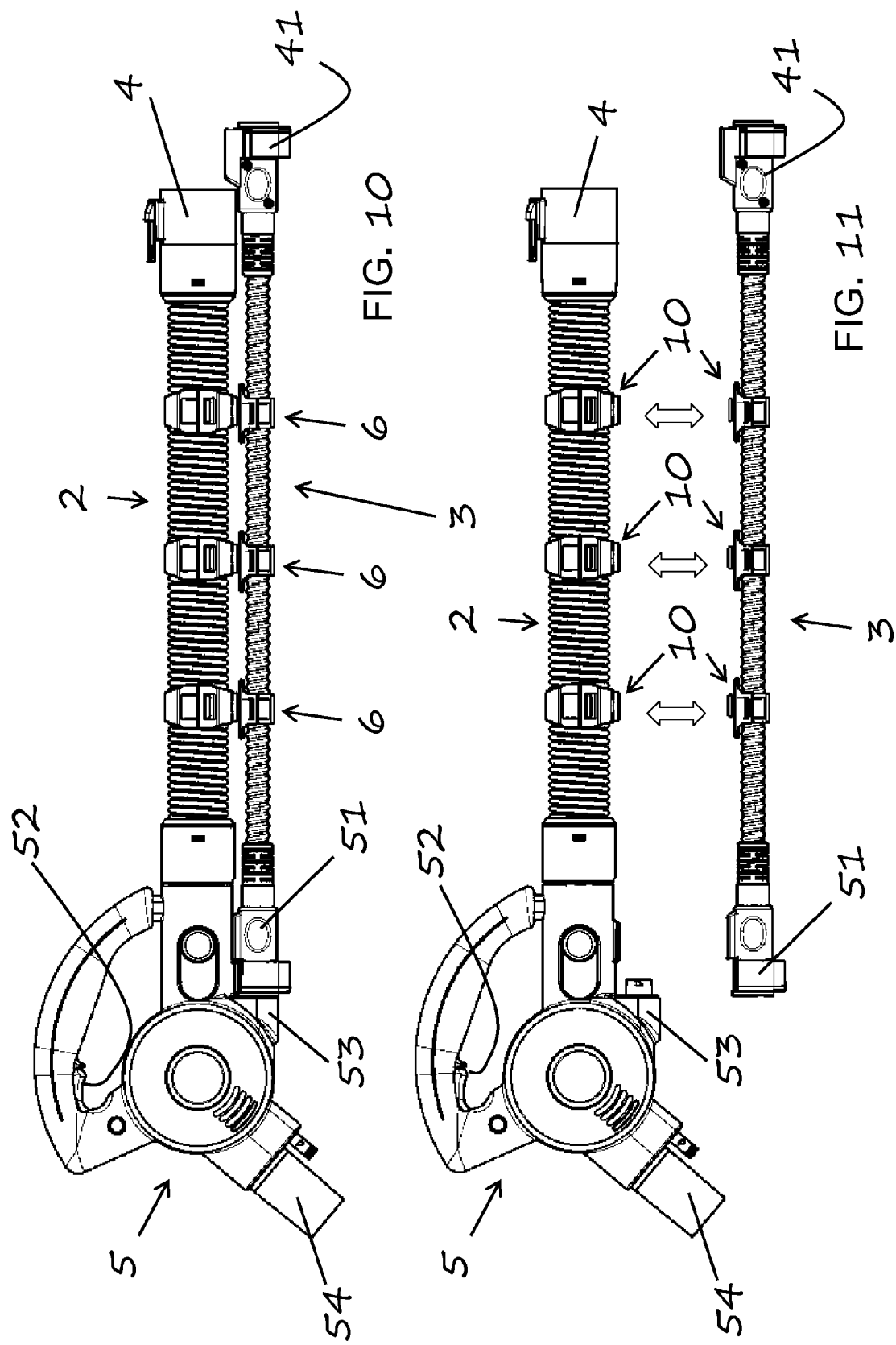

SEPARABLE HOSE SYSTEM FOR STEAM AND VACUUM CLEANING

CROSS-REFERENCE TO RELATED APPLICATIONS

The present application is a U.S. National Phase filing of International Application No. PCT/EP2014/060739, filed on May 23, 2014, designating the United States of America and claiming priority to Italian Patent Application No. MI2013U000288, filed Aug. 8, 2013, and this application claims priority to and the benefit of the above-identified applications, which are all incorporated by reference herein in their entireties.

FIELD OF THE INVENTION

The present invention relates to vacuum cleaners with steam functionality (steam and vacuum cleaner), preferably to canister steam and vacuum cleaners, comprising a suction hose and a steam hose for respectively suctioning dirt and conveying steam, wherein the steam hose is external to the suction hose and comprises, at each end, a detachable connector, preferably a rapid-fitting detachable connector, for optionally detaching the steam hose when using only the vacuum cleaning functionality.

BACKGROUND OF THE INVENTION

It is very advantageous, in order to perform deep and complete cleaning of domestic surfaces (such as floors, windows, mattresses, walls, etc.), to employ a cleaner with multiple functions. In particular, a cleaner capable of drawing dust and/or liquids with high efficiency, while providing steam for removing embedded dirt and grime, is particularly profitable. The use of high temperature steam results in fact in deeper and more hygienic cleaning.

Steam and vacuum cleaners are suitable for performing deep cleaning and sanitization of domestic surfaces. Generally, steam and vacuum cleaning devices comprise at least one hose for conveying dirt (from domestic surfaces to a dirt collector) and steam (from a steam generator to domestic surfaces). Typically, at one end, the at least one hose is plugged to the main body of the steam and vacuum cleaner through one or more hose connector(s); on the other end, the at least one hose terminates with one or more nozzle(s), optionally by interposition of further hoses or conduits.

When using steam and vacuum cleaners, besides a high efficiency of suction and steam generation, good maneuverability and easiness of use are highly desirable, in particular when dealing with vertical and/or irregular surfaces.

At the present, in the aim of providing cleaning devices with the above mentioned requisites, the most advantageous devices are canister steam and vacuum cleaners, wherein the motor, the dust collector and preferably also the steam generator are located within a compact main body.

Canister vacuum cleaners are typically provided with one or more flexible hose(s) to which different nozzles can be connected for different uses.

It is very convenient that also the one or more hoses, for the countercurrent conveyance of suctioned dirt and steam, are easy to maneuver, not bulky and light to lift.

Conventional devices often comprise distinct hoses or conduits for dirt and steam conveyance. Typically, said conduits are stably and strictly associated one to another, although devices with separate conduits, each having separate inlet and/or outlet, are at disposal as well. In some cases, the two conduits or hoses are combined to form a single hose. For example, the steam conduit can be arranged in an inner portion of the suction conduit, when the suction conduit has a transverse section of larger diameter than the steam conduit. The hose systems of the prior art, whether comprising steam and suction hoses separated or mutually joined into a single structure, are however very unhandy.

CN200977120Y discloses a hose system comprising the suction conduit and the steam conduit joined together to form a single hose. In particular, the steam conduit is located in a cavity established on the sleeve of the suction conduit; the sleeve of the suction conduit and the sleeve of the steam conduit are then stably wrapped together in an outer sleeve, forming a single hose.

EP2604906 discloses a hose system comprising a suction conduit and a steam conduit, wherein the steam conduit is arranged in a channel extending longitudinally to the suction conduit and stably bond to the latter with lateral edges.

US2004111822 discloses a steam and vacuum cleaner. In one embodiment the steam hose is external to the suction hose and is joined to the suction hose by means of several bands. In a second embodiment, a major portion of the steam hose is located inside the suction hose; it exits the suction hose in the last portion and enters the nuzzle by means of an L-connection.

JPH07100087 discloses a steam and vacuum cleaner, wherein the suction and steam hoses are either physically separated, linked to the body of the cleaner with two different connectors, or both stably inserted inside a tube of bigger diameter.

JPH08150104 discloses a device wherein the steam generator is located on one side the terminal portion of the suction hose. A short steam conduit, separated from the suction hose, conveys steam. The terminal end of said steam conduit enters the suction nozzle and steam is supplied by means of holes at the base of said nozzle.

US2001034922 discloses a steam and vacuum cleaner wherein the steam and vacuum hoses are completely separated and each one is linked to a separate nozzle. Two separate hoses are disclosed in KR100773728 and KR100737778, as well.

The steam and vacuum cleaners currently available on the market preferably comprise joined steam and vacuum conduits. A single hose system, wherein the suction and steam hoses are permanently associated, being for example produced by co-extrusion into a single structure (as in the more recent developments of steam and vacuum cleaning devices), can be more tidy and easy to use, but it is usually rigid and heavy to be carried about. Furthermore, the production of a single hose system, e.g. by co-extrusion, is generally more expensive.

On the other side, even the systems comprising physically separated hoses, which are joined for example by means of bands, force the user to carry about both the tubes even when alternative and exclusive use of vacuum or steam functionality is required.

According to consumers, one of the main problems encountered with steam and vacuum cleaning devices is their poor maneuverability and heaviness, compared to conventional "pure" vacuum cleaners, in particular of the hose system which is handled by the user. This concern leads to poor marketability of the currently available devices, providing both steam and vacuum cleaning functionality, compared to the marketability of pure vacuum cleaners.

It is an aim of the present invention to provide a steam and vacuum cleaner which is handier, more maneuverable than conventional devices, and which is economically valuable.

The solution offered by the present invention is the provision of a steam and vacuum cleaner, preferably a canister steam and vacuum cleaner, comprising a hose system wherein the steam hose is external to the suction hose and the steam hose can be easily detached from the main body of the steam and vacuum cleaner when the steam cleaning function is not employed.

SUMMARY OF THE INVENTION

The present invention relates to a vacuum cleaner with steam functionality, preferably a canister vacuum cleaner with steam functionality (canister steam and vacuum cleaner), comprising a suction hose for vacuum cleaning and a steam hose for steam conveyance and supply, wherein the steam hose is external to the suction hose, preferably extending parallel to it, and comprises, at each end, a detachable connector (steam hose connectors), preferably a rapid-fitting detachable connector, more preferably a bayonet connector.

More preferably, the steam and vacuum cleaner of the invention comprises a main body having height, width and length dimensions such that at least one of said dimensions is equal to or less than 300 mm, preferably equal to or less than 280 mm, more preferably equal to or less than 270 mm. Most preferably the steam and vacuum cleaner of the invention is a canister steam and vacuum cleaner, having a main body whose height, width and length dimensions are such that at least one of said dimensions is equal to or less than 300 mm, preferably equal to or less than 280 mm, more preferably equal to or less than 270 mm.

The steam hose can be connected to the main body of the steam and vacuum cleaner by means of said steam hose connectors. By detaching the steam hose connectors from the steam and vacuum cleaner, the steam hose can be completely released. This is very advantageous when the cleaning device is operated in vacuum cleaning mode, without using the steam functionality, since the steam hose can be completely detached and the suction hose can be used alone, more comfortably and with less effort in carrying it about.

In the hose system of the present invention the steam hose can thus be easily and completely separated from the suction hose and from the main body of the steam and vacuum cleaner.

In a preferred embodiment, one end of the suction hose is stably associated to a connector (suction hose connector), which connector can in turn be plugged into the main body of the cleaning device through a suction hose inlet; the other end is preferably associated to a handle.

The steam hose is instead reversibly associated to the steam and vacuum cleaner by means of the steam hose connectors, preferably rapid-fitting detachable connectors, more preferably bayonet connectors. In a preferred embodiment, the steam hose is reversibly connected to the suction hose connector, and plugged to the main body through the steam hose inlet. The steam hose connectors can be rapidly inserted in or detached from the steam hose inlet and the suction hose connector.

In a preferred embodiment, the steam hose and the suction hose are reversibly joined by means of one or more detachable joints located at selected portions of the hoses, along their longitudinal axis.

The detachable joints, which reversibly join the suction and steam hoses according to preferred embodiments of the invention, are preferably articulated joints, which can move along a longitudinal axis and rotate, thus allowing the sliding and/or the rotation of one hose in respect to the other. In a preferred embodiment, the detachable joints, preferably articulated joints, comprise snap fasteners.

Preferably, the suction hose and the steam hose are flexible hoses.

The hose system of the present invention is highly comfortable, handy and maneuverable. Furthermore, it is economically valuable, as it can be produced with common materials, commercially available.

BRIEF DESCRIPTION OF FIGURES

FIG. 1 is a side view a hose system according to a preferred embodiment of the invention comprising the suction hose and the steam hose. The hoses are represented in joined configuration with detachable connectors and detachable joints connected.

FIG. 2 is a side view of the hose system of FIG. 1, with the steam hose detached from the suction hose.

FIG. 10 is a side view a hose system according to a preferred embodiment of the invention comprising the suction hose and the steam hose. The steam hose comprises at each end detachable bayonet connectors. The hoses are represented in joined configuration with detachable joints connected.

FIG. 11 is a side view the hose system of FIG. 10, wherein the hoses are represented in detached configuration.

DETAILED DESCRIPTION OF THE INVENTION

Figure 3:
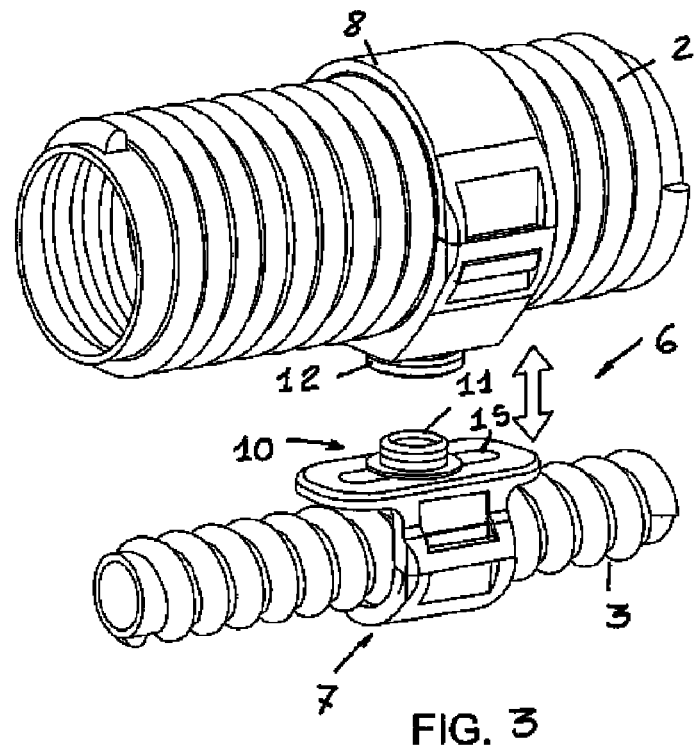
FIG. 3 is a perspective view of a detachable joint in detached configuration, according to a preferred embodiment of the invention.
Figure 4:
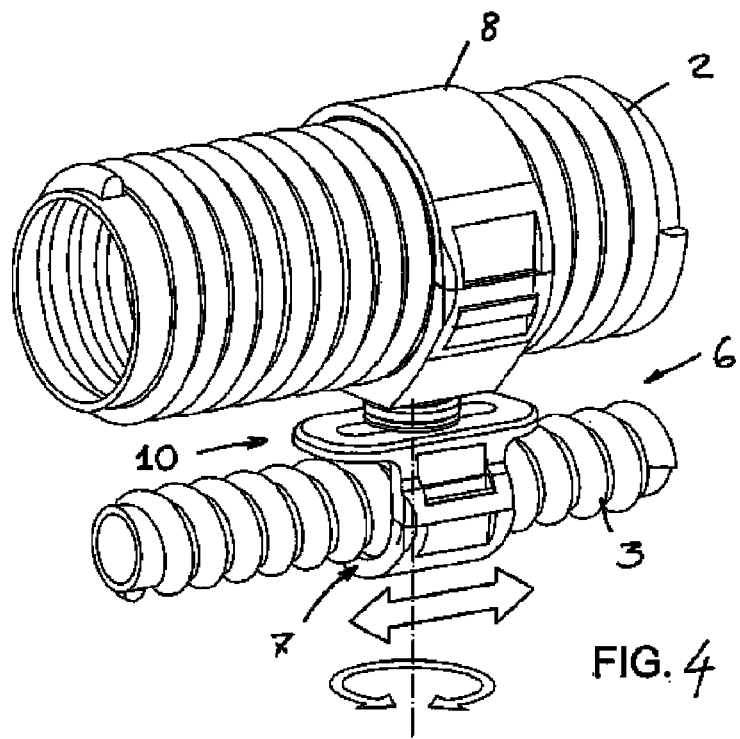
FIG. 4 is a perspective view of the detachable joint of FIG. 3 in joined configuration.
Figure 5:
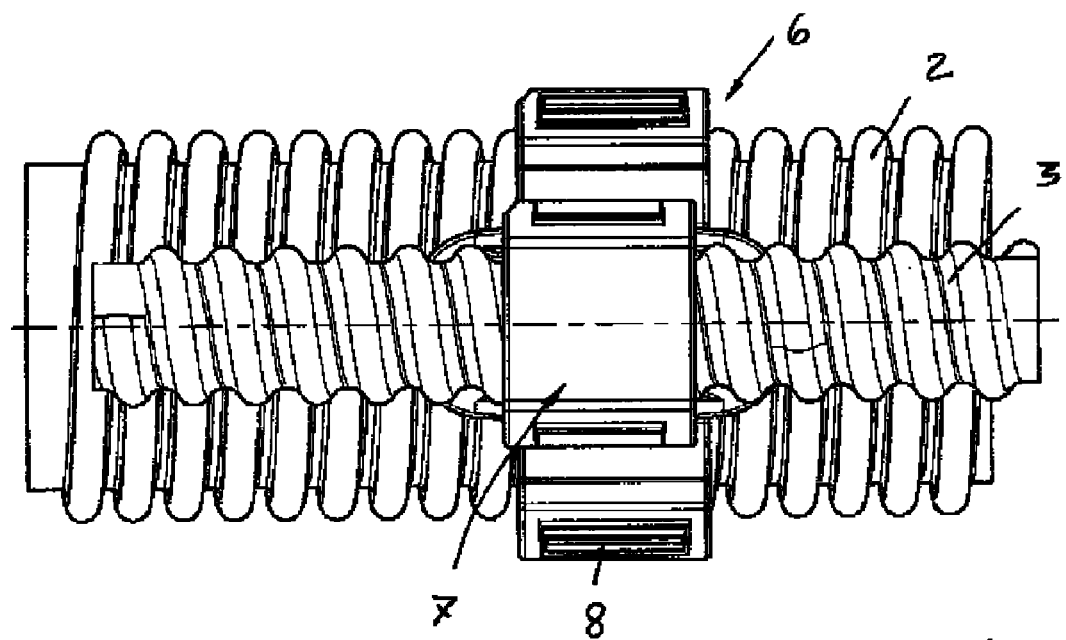
FIG. 5 is a plan view of the suction hose and the steam hose connected by a detachable joint, according to a preferred embodiment of the invention, and aligned in parallel.
Figure 6:
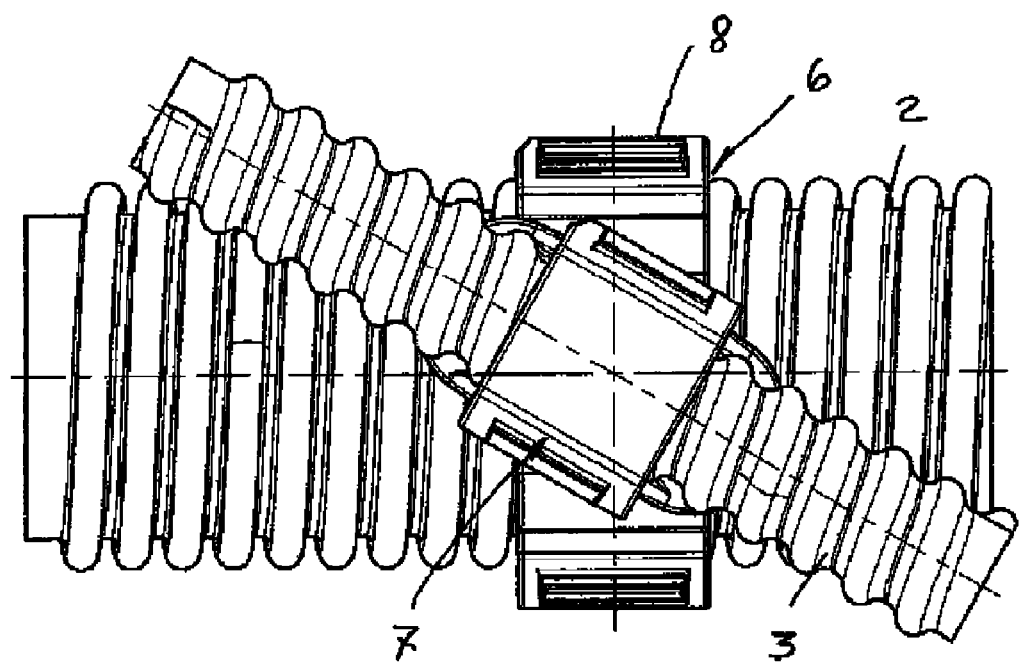
FIG. 6 is a plan view of the suction hose and the steam hose connected by a detachable joint, according to a preferred embodiment of the invention. The figure illustrates the possibility of a rotational movement along the vertical axis of the detachable joint, making it possible to move the two hoses independently, while connected together, on different horizontal axes.
Figure 7:
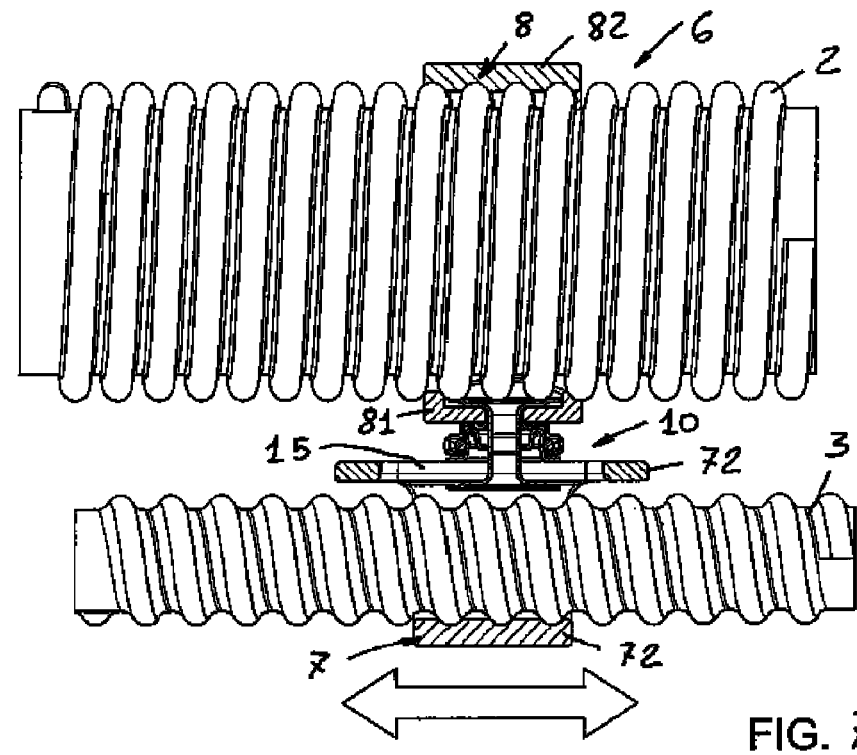
FIG. 7 is a side view of a detachable joint, according to a preferred embodiment of the invention, connecting the suction hose with the steam hose, in rest position.
Figure 8:
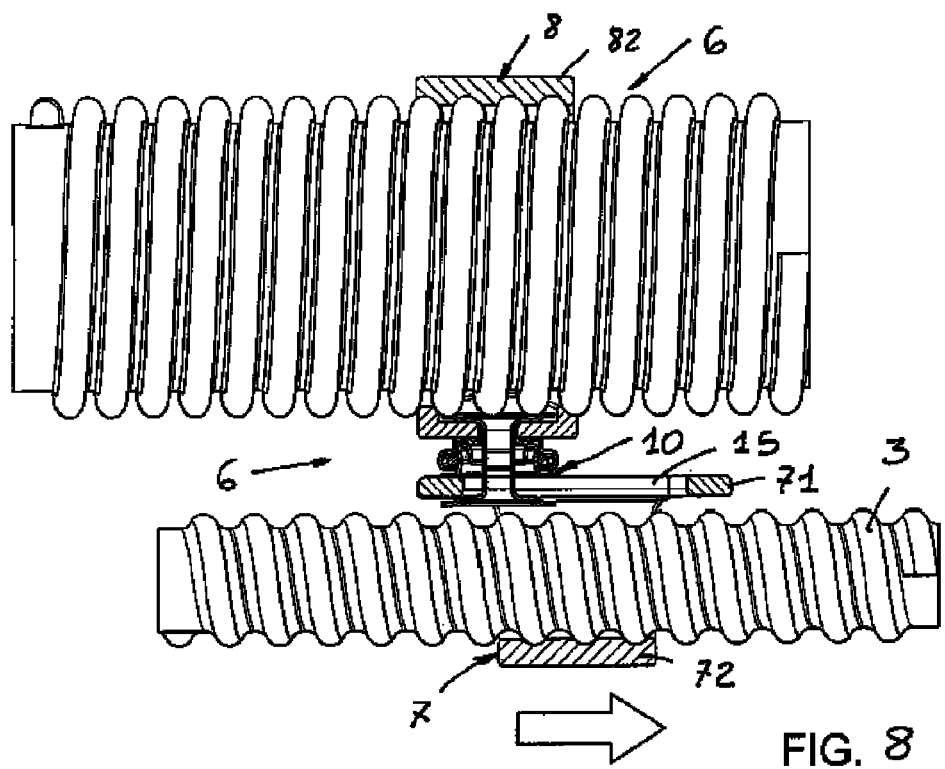
FIG. 8 is a side view of a detachable joint, according to a preferred embodiment of the invention, illustrating the possibility of sliding the two hoses along their longitudinal axes.

The present invention relates to a steam and vacuum cleaner, preferably a canister steam and vacuum cleaner, comprising a suction hose for vacuum cleaning and a steam hose for steam conveyance and supply, wherein the steam hose is external to the suction hose and comprises, at each end, a detachable connector (steam hose connectors), preferably a rapid-fitting detachable connector or equivalents, more preferably a bayonet connector. By detaching said steam hose connectors from the steam and vacuum cleaner, the steam hose can be completely released.

More preferably, the steam and vacuum cleaner of the invention comprises a main body having height, width and length dimensions such that at least one of said dimensions is equal to or less than 300 mm, preferably equal to or less than 280 mm, more preferably equal to or less than 270 mm.

Preferably, the suction hose is in fluid communication with a dirt collector and the steam hose with a steam generator, both comprised within the main body of the steam and vacuum cleaner.

Preferably, one end of the suction hose can be connected to the main body of the steam and vacuum cleaner by means of a connector (vacuum hose connector), to which said suction hose is stably associated. The vacuum hose connector is preferably plugged in a vacuum hose inlet, on the main body of the steam and vacuum cleaner.

The vacuum hose inlet is preferably in fluid communication with a filtering section, wherein solid and or liquids are separated from the suctioned air, by means of a conduit.

The other end of the suction hose can be stably associated to a handle.

The handle can be connected, on the other side, to a nozzle, optionally through a further tube.

In a preferred embodiment, the handle comprises a switch for operating the steam hose functionality. Preferably said switch opens an electric valve, associated to the steam generator, with consequent supply of steam through the steam hose.

In a preferred embodiment, one end of the steam hose, comprising the detachable steam hose connector, preferably rapid-fitting detachable connector, more preferably bayonet connector, is reversibly associated to the main body of the steam and vacuum cleaner, at a steam hose inlet.

Preferably, the other end of the steam hose, comprising the detachable steam hose connector, preferably rapid-fitting detachable connector, more preferably bayonet connector, is reversibly connected to the handle of the cleaning device.

Preferably, the steam hose reversibly associated to the main body is also reversibly connected to the vacuum hose connector, more preferably reversibly joined at the lower portion of the same by means of a bayonet connector. Said embodiment is desirable as it makes the connection of the steam hose to the main body more stable when using the steam functionality.

The steam hose connectors according to the present invention are easy and fast to connect and detach, at user's convenience. In particular, when the user wishes to use only the vacuum function of the cleaning device, he/she can separate the steam hose from the steam and vacuum cleaner by easily and rapidly detaching the steam hose connectors. When the steam hose is detached from the main body, the steam generator is preferably switched off and an electric valve is closed, avoiding steam exit from the steam generator.

According to a preferred embodiment of the present invention, the steam hose and the suction hose are reversibly joined by means of one or more detachable joints. Preferably, the one or more detachable joints comprise a first element associated to the steam hose and a second element associated to the suction hose, at selected positions of the same. The suction hose and the steam hose can thus be joined or separated each other by means of the one or more detachable joints.

When the steam hose and the suction hose are joined together, these extend each other in parallel, along a longitudinally axis.

Preferably, the detachable joints further comprise a removable fastening element. More preferably, the detachable joints comprising the removable fastening elements are articulated, being thus suitable for keeping the hoses together, still allowing the reciprocal movement of the hoses. In particular, the first element, associated to the steam hose, can rotate and slide in respect to the second element, associated to the suction hose, by means of the removable fastening element, consequently the steam hose can slide and rotate in respect of the suction hose, in correspondence to the detachable joints.

Figure 9:
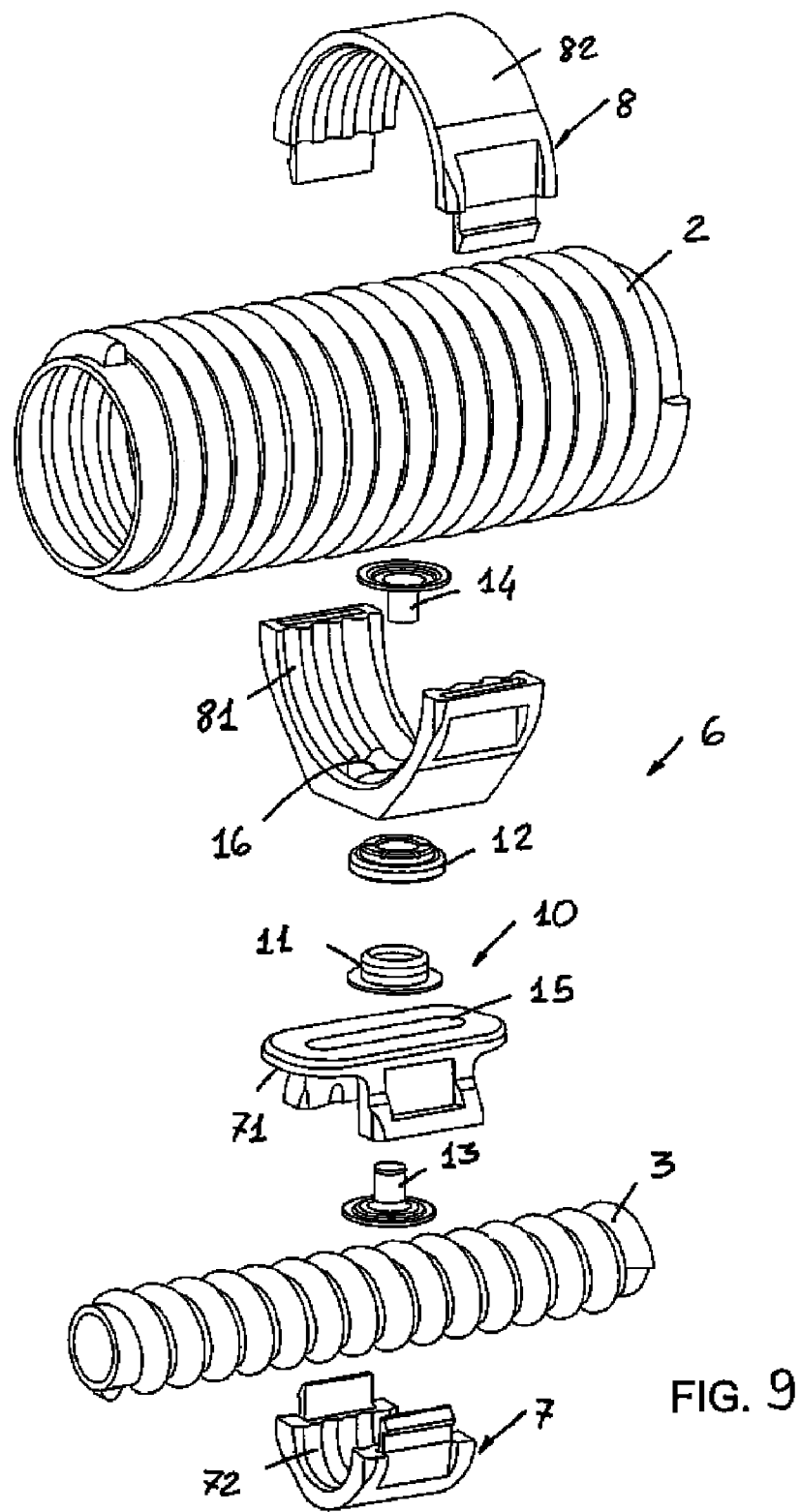
FIG. 9 shows a perspective view, partially exploded, of a preferred embodiment of a detachable joint.
Figure 12:
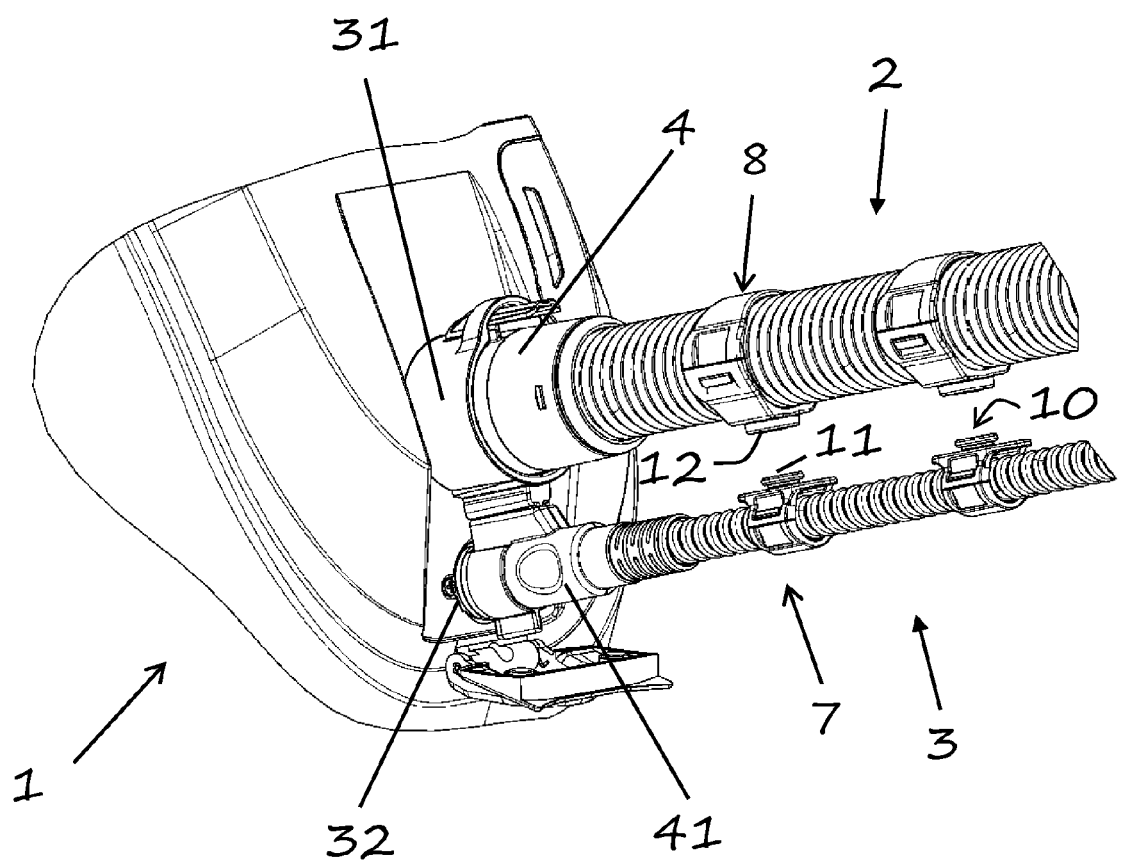
FIG. 12 is a perspective view of a preferred embodiment of the hose system, connected to the main body of a canister vacuum and steam cleaner through the suction hose and the steam hose inlets.
Figure 13:
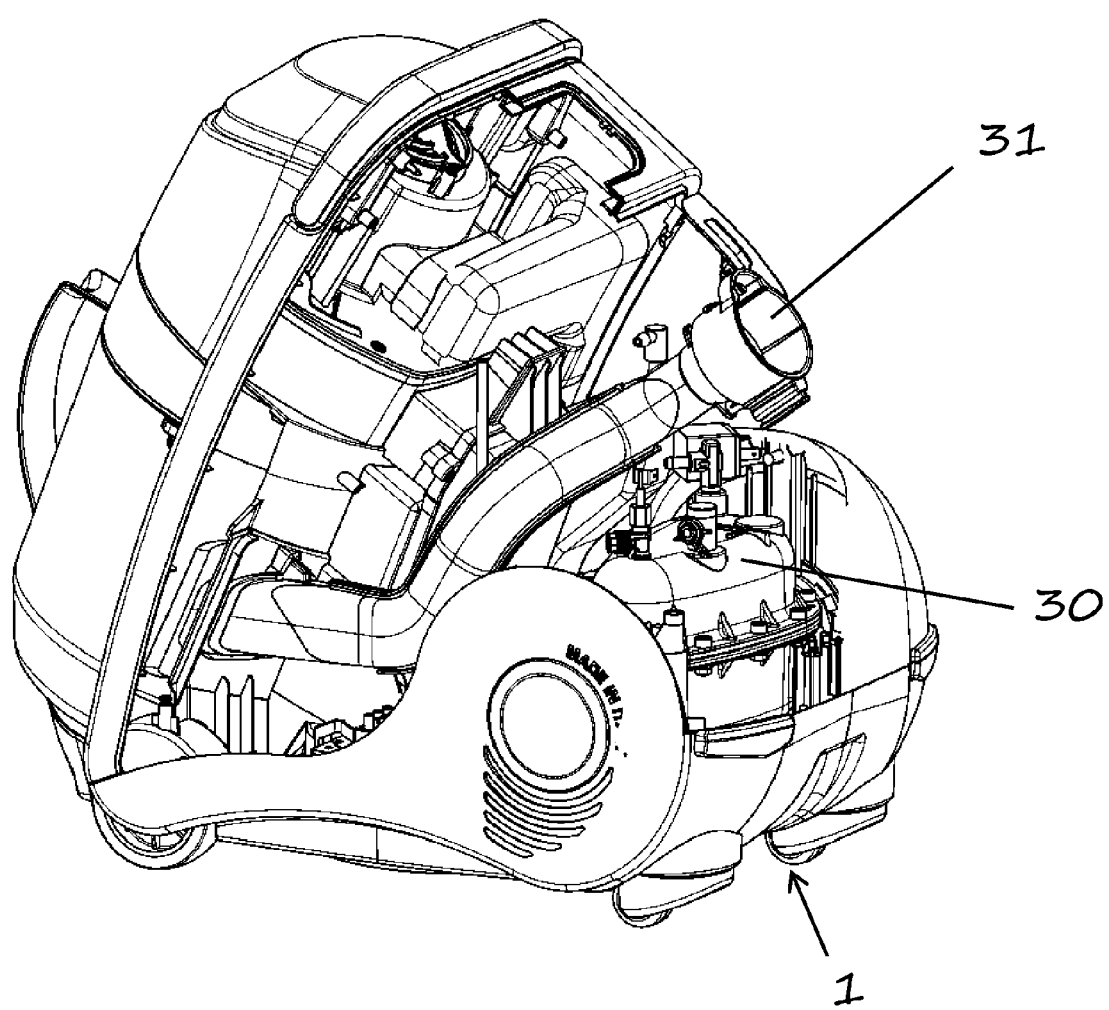
FIG. 13 is a perspective view of the preferred embodiment of FIG. 12, wherein the rear cover has been removed in order to show the steam generation means and the conduit conveying the suctioned air to a filtration section.

In a preferred embodiment, the removable fastening element comprises a snap-fastener, composed of a base element and a top element, wherein the base element and the top element can be temporary associated with hand pressure. Said base element is preferably associated to the first element of the detachable joint, which is in turn bound to the steam hose, by means of a rivet, wherein the rivet can slide inside a loop, which is part of the first element. The base element can also rotate around the rivet, through the rotation of the rivet itself inside the loop. Said preferred embodiment is illustrated in FIG. 9. Said top element is preferably associated to the second element of the detachable joint, which is in turn bound to the suction hose, by means of a rivet, wherein the rivet is stably inserted into a groove, which is part of the second element.

The elements of the detachable joint, respectively associated to the suction hose and to the steam hose, can be easily connected and detached. When one or more joints are connected, the suction hose and the steam hose are connected together.

The detachable joints, according to a preferred embodiment of the invention, provide a certain freedom of reciprocal movement. Preferably, this is due to the sliding and rotation movements of the rivet of the base element.

Preferably, the suction hose of the present invention has a diameter which is larger than the diameter of the steam hose.

Preferred embodiments of the present invention will be now described in more details with reference to the drawings.

A side view of a hose system according to a preferred embodiment the present invention is shown in FIG. 1. The hose system comprises a suction hose (2) and a steam hose (3), extending each other in parallel. The suction hose (2) is stably associated to the vacuum hose connector (4) and to the handle (5).

The steam hose (3) of FIG. 1 is associated to the vacuum hose connector (4) and to the handle (5) by means of detachable connectors, preferably bayonet connectors (steam hose connectors, 41 and 51), according to an embodiment of the invention. The steam hose (3) is shown joined to the suction hose by means of the one or more detachable joints (6).

FIG. 2 shows the hose system of FIG. 1, according to a preferred embodiment of the present invention, wherein the steam hose (3) is completely detached from the suction hose.

FIGS. 3 to 9 show in detail preferred embodiments of the detachable joint (6). Each detachable joint is composed of a first element (7), associated to the steam hose (3), and a second element (8), associated to the suction hose (2). The first element (7) is capable of rotating and sliding in respect to the second element (8) by means of a removable fastening element (10). Preferably, the removable fastening element

(10) is a snap-fastener comprising a base element (11), associated to the first element (7) by means of rivet (13), and a top element (12). The rivet (13) can slide and rotate inside a loop (15) of the first element (7), so that the base element (11) itself can slide and rotate inside the loop (15).

FIG. 9 shows a preferred embodiment wherein the first element (7) is composed of two portions (71 and 72, in FIGS. 7-9), wherein portion (71) comprises the loop (15). The two portions (71 and 72) can be snap connected as to stably embrace the steam hose in a selected portion of the same. Also the second element (8) is shown composed of two portions (81 and 82, in FIGS. 7-9), according to a preferred embodiment, which can be snap connected in order to embrace the suction hose (2) in a selected portion of the same.

According to a preferred embodiment, the top element (12) of the fastening element (10) is associated to the second element (8) by means of rivet (14) which is inserted into a groove (16) of the portion (81) of the second element (8), as illustrated in FIG. 9.

When the two hoses are joined together by means of one or more detachable joints (6), the top element (12) and the base element (11) of the one or more fastening elements (10) are joined; the rivet (13) and the base element (11) associated to the first element (7) can rotate and slide inside the loop (15), making the first element (7), and thus the steam hose (3), rotating and sliding in respect to the suction hose (8).

FIGS. 10 and 11 illustrate preferred embodiments of the invention, wherein the steam hose and the suction hose are joint each other (FIG. 10) or detached (FIG. 11). The steam hose (3) is connected at one end to the handle (5), by means of the detachable connector (51), which is inserted in a portion of the handle (53) preferably below the stable vacuum hose connection.

The handle preferably comprises the switch (52) for operating the steam function.

At the free end of the handle an outlet is shown (54), which is preferably connected to a nozzle, optionally by means of further hoses.

The detachable steam hose connectors of the invention, preferably rapid-fitting connectors, more preferably bayonet connectors, make it possible to easily and rapidly detaching the steam hose from the steam hose inlet (32) present on the main body (1), when using only the vacuum function of the steam and vacuum cleaner.

Furthermore, the detachable joints (6) according to a preferred embodiment of the invention, allow to keep the suction hose and the steam hose advantageously together when using both steam and vacuum functionalities, while still making it possible to easily and rapidly detach the steam hose when using only the vacuum functionality.

A hose system wherein the steam and vacuum hose are connected by articulated detachable joints, according to a preferred embodiment of the invention, is particularly profitable as it allows the reciprocal movement of the suction and steam hoses, making the hose system highly maneuverable.

The invention claimed is:

1. A steam and vacuum cleaner comprising:
   a main body;
   a suction hose for vacuum cleaning; and
   a steam hose for steam conveyance and supply,
   wherein the steam hose is external to the suction hose, and comprises, at each end, a detachable connector by detaching which the steam hose is detached from the steam and vacuum cleaner,
   wherein the steam hose and the suction hose are reversibly connected each other by means of one or more detachable joints,
   wherein the one or more detachable joints comprise a first element associated to the steam hose and a second element associated to the suction hose, and
   wherein the one or more detachable joints comprise a removable fastening element comprising a base element and a top element, wherein the base element is associated to the first element of the detachable joint and the top element is associated to the second element of the detachable joint, and wherein the base element and the top element are reversibly mated.

2. The steam and vacuum cleaner of claim 1, wherein at least one of the detachable connectors is a bayonet connector.

3. The steam and vacuum cleaner of claim 1 further comprising a handle.

4. The steam and vacuum cleaner of claim 3, wherein the handle comprises a switch for activating the steam functionality.

5. The steam and vacuum cleaner of claim 3, wherein one end of the suction hose comprises a connector and the other end of the suction hose comprises the handle, and wherein said vacuum hose connector is associated to the main body through a vacuum hose inlet.

6. The steam and vacuum cleaner of claim 5, wherein one steam hose detachable connector is reversibly connected to the vacuum hose connector.

7. The steam and vacuum cleaner of claim 3, wherein one steam hose detachable connector is reversibly connected to the handle.

8. The steam and vacuum cleaner of claim 3, wherein the handle is connected to a nozzle.

9. The steam and vacuum cleaner of claim 1, wherein the steam hose is in fluid communication with a steam generator, and wherein one steam hose detachable connector is reversibly associated to the main body through a steam hose inlet.

10. The steam and vacuum cleaner of claim 1, wherein the removable fastening element is a snap-fastener.

11. The steam and vacuum cleaner of claim 1, wherein the first element comprises a loop, extending parallel to the longitudinal axis of the steam hose, and the base element of the removable fastening element comprises a rivet, wherein the base element is associated to the first element by means of the rivet, and wherein the rivet is inserted inside said loop and can slide and rotate inside the loop.

12. The steam and vacuum cleaner of claim 1, wherein the top element comprises a rivet and the second element comprises a groove, wherein top element is associated to the second element by means of the rivet and wherein the rivet is inserted inside the groove.

13. The steam and vacuum cleaner of claim 1, wherein the main body has width, length and height dimensions such that at least one of said dimensions is equal or less than 300 mm.

14. The steam and vacuum cleaner of claim 13, wherein the least one of said dimensions is equal or less than 280 mm.

15. The steam and vacuum cleaner of claim 14, wherein the least one of said dimensions is equal or less than 270 mm.

16. The steam and vacuum cleaner of claim 1, wherein the stream and vacuum cleaner comprises a canister steam vacuum cleaner.

17. The steam and vacuum cleaner of claim 1, wherein the detachable connector comprises a rapid fitting detachable connector.

18. The steam and vacuum cleaner of claim 1, wherein the first element is composed of two portions and the second element is composed of two portions, wherein the two portions of the first element and the two portions of the second element are connected by snap-fit to stably wrap the steam hose and the suction hose respectively, in selected portions of the same.

\* \* \* \* \*